United States Patent [19]

McGrady et al.

[11] Patent Number: 4,787,576
[45] Date of Patent: Nov. 29, 1988

[54] AUTOMATIC MULTI-POSITION G-PROTECTIVE EJECTION SEAT ASSEMBLY

[75] Inventors: Michael B. McGrady, Federal Way; James M. Huber, Seattle; Gerald F. Herndon, Bellevue; Stephen F. Sielaff, Federal Way; Jerry T. Shearer, Seattle, all of Wash.

[73] Assignee: The Boeing Company, Seattle, Wash.

[21] Appl. No.: 913,482

[22] Filed: Sep. 29, 1986

[51] Int. Cl.$^4$ .................. B64D 25/04; B64D 25/10
[52] U.S. Cl. ....................... 244/122 R; 244/118.5; 244/122 AG; 244/122 A; 600/20
[58] Field of Search ............... 244/121, 122 R, 122 A, 244/122 AE, 122 AG, 118.5, 234, 236; 128/1 A; 297/216, 217, 330; 5/68

[56] References Cited

U.S. PATENT DOCUMENTS

| | | | |
|---|---|---|---|
| 2,726,831 | 12/1955 | Bleck et al. | 244/122 A |
| 3,098,631 | 7/1963 | Hall et al. | 244/122 R |
| 3,826,434 | 7/1974 | Von Beckh | 244/122 R |
| 3,966,146 | 6/1976 | Roberts . | |
| 3,981,465 | 9/1976 | Sinnett et al. | 244/122 R |
| 4,004,763 | 1/1977 | Bunnell, III et al. | 244/122 AG |
| 4,243,024 | 1/1981 | Crosbie et al. . | |
| 4,301,983 | 11/1981 | Horan | 244/122 AG |
| 4,484,722 | 11/1984 | Larson et al. . | |

*Primary Examiner*—Galen Barefoot
*Attorney, Agent, or Firm*—Seed and Berry

[57] ABSTRACT

A G-protective ejection seat assembly for an occupant of the cockpit of an aircraft. The assembly includes a cradle having a rigid, non-articulated upper portion and a rigid lower portion pivotally attached to the upper portion. The upper portion is pivotally attached to the aircraft for selected angular movement within the cockpit between an upright position and a reclined position. The cradle upper portion includes arm rests movable therewith for supporting hand flight controls. Foot flight controls are mounted to the cradle lower portion which is formed by a pair of leg rests. The assembly includes a separable, non-articulated ejection seat removably carried by and stationary with respect to the cradle upper portion during non-ejection use. The seal is moved with the cradle upper portion as the cradle upper portion pivots between the upright and reclined positions. The seat is movable upon ejection independent of the cradle with the cradle and the hand and foot controls remaining in place within the aircraft during ejection. A power actuator is provided for selectively, angularly moving the cradle upper portion between the upright and reclined positions. A controller is provided to control operation of the actuator in response to sensed G-force at the pilot's station and anticipatory aircraft G-force related performance based upon aircraft stick position, angle of attack and other parameters.

33 Claims, 5 Drawing Sheets

AUTOMATIC MULTI-POSITION G-PROTECTIVE EJECTION SEAT ASSEMBLY

DESCRIPTION

1. Technical Field

The present invention relates generally to ejection seats, and more particularly, to an ejection seat for a high performance aircraft that repositions the body of the occupant to improve G-load tolerance during flight.

2. Background of the Invention

Existing high performance aircraft subject their pilots to high accelerations or G-loads both in the direction of the flight path and along the vertical or Z-axis of the aircraft during curved flight trajectories. Such aircraft are capable of rapid G-onset and high sustained G-loads far in excess of the tolerance of man. Existing and developmental anti-G suits, positive pressure breathing systems, and rapid response G-valves are limited in the amount of pilot physiological protection they provide. It has long been known that reclining of the pilot when under curved flight trajectories producing Z-axis G-loads on the normally erect pilot which tend to drain blood away from the brain and toward the lower extremities will increase the ability of the pilot to withstand the loading.

Unfortunately, reclining seat designs proposed in the past are unsatisfactory, particularly for future generation high performance aircraft which have even higher G-performance envelopes than existing aircraft. G-induced loss of consciousness can result in not only the pilot blacking out, but also in amnesia and convulsions. As the pilot regains consciousness, his perception of time and space may be distorted. Sometimes a pilot will experience a profound apathy as he comes out of an unconscious spell, and this period of apathy may last as long as half a minute. By the time the pilot regains consciousness the aircraft may be flying in a dangerous attitude, and the pilot may not realize or be able to fully appreciate the seriousness of the situation. When unintentionally flying upside down or with the nose pointing down at twice the speed of sound, a crash may result.

Performing an anti-G straining maneuver is helpful if it is performed properly and if it is performed in time to be of any use, but is not by itself sufficient. Similarly, reclining of the pilot's seat is helpful, but only if done in time to be of any use. Future generation high performance aircraft will subject the pilot to increasingly rapid G-onset during a G-load producing maneuver, which may surprise the pilot and provide him with insufficient time to react or cause him to lose consciousness without warning. In the heat of battle, occasionally, pilots will enter a maneuver which produces more G-load than anticipated or enter the maneuver more rapidly than intended, thus, not allowing the pilot sufficient time to prepare for the G-loading. This is particularly a problem with future generation aircraft which can sustain high G-maneuvers for prolonged periods and do high G-maneuvers back-to-back.

In the past, reclining seats have had certain disadvantages associated with them, such as requiring the pilot to manually fix the seat angle. This forces the pilot to reposition the seat prior to an engagement and fight the entire engagement in a reclined position. Visibility is seriously reduced when the seat is reclined and some pilots do not like to go into a reclined position because of the loss of visibility continues during not only the high-G maneuver but until the reclined seat can be returned to the upright position. Because of other pilot duties, the time until the seat is placed in the upright position can be longer than necessary to overcome the G-force problem and as a result pilot visibility is unduly diminished. Use of a large reclined seat angle not only decreases pilot vision, but also his mobility, situational awareness and overall performance. If the seat is reclined for the full duration of the engagement, these factors adversely affect the pilot during the entire engagement profile even though the high G-loads are only encountered during a small portion of the engagement.

Another problem with existing reclining seats is that they usually require the pilot body posture to change drastically between the reclined and upright positions. The seats have an articulated seat structure with the seat bottom, seat back and head rest being angularly movable with respect to each other. This can adversely affect the ability of the pilot to maintain a steady performance during flight while the seat is being moved between the reclined and upright positions, particularly during or close to an engagement. Additionally, when the seat is in the reclined position, ejection is usually not possible and must wait until the seat is returned to the upright position. Of course, by the time the seat can be returned, or in the case of a seat failure, it may not be possible to eject in a timely manner. Another drawback with such articulating seats is that the mechanical structure involved adds significant bulk, weight and complexity to the ejection seat, which adversely affects the reliability, maintainability, propulsion system and safety of the overall escape system.

DISCLOSURE OF THE INVENTION

The present invention resides in a G-protective ejection seat assembly for an occupant of the cockpit of an aircraft utilizing a separable ejection seat. The ejection seat includes propulsion means for separating the seat from the cockpit and propelling the seat with the occupant therein free of the cockpit during ejection. In the presently preferred embodiment, the assembly has a cradle having a non-articulated upper portion and a lower portion pivotally attached to the upper portion. The cradle upper portion is pivotally attachable to the aircraft for selective angular movement within the cockpit between an upright position and a reclined position. The cradle upper portion is selectively positionable in the upright and reclined positions and in a plurality of angular positions therebetween. The ejection seat is releasably carried by and substantially stationary with respect to the cradle upper portion during non-ejection use. The seat is moved with the cradle upper portion as the cradle upper pivots between the upright and reclined positions. The cradle is arranged to support the occupant in the seat in a normally upright position when the cradle upper portion is in the upright position and in a supine position when the cradle upper portion is in the reclined position.

The cradle has control support means for supporting hand and foot flight controls of the aircraft for movement with the cradle. The control support means includes upper support means for supporting the hand flight controls on the cradle upper portion for movement therewith, and lower support means for supporting the foot flight controls on the cradle lower portion for movement therewith. In the preferred embodiment, the upper support means includes at least one arm rest to which the hand flight controls are mounted.

The ejection seat is movable upon ejection independent of the cradle and the hand and foot flight controls supported by the cradle. Upon ejection, the cradle and the hand and foot controls remain in place within the aircraft while the seat is propelled out of the cockpit.

The assembly further includes power means for selectively, angularly moving the cradle upper portion between the upright and reclined positions. The power means includes an actuator connected between the cradle and the aircraft for applying directed force on the cradle. Means are provided for pivotally moving the cradle lower portion between a lowered position and a raised position in response to movement of the cradle upper portion between the upright and reclined positions, respectively. The cradle lower portion includes a pair of spaced apart leg rest, each separately pivoted to the cradle upper portion and to the aircraft.

The ejection seat assembly has upper cradle linkage arms pivotally attaching the cradle upper portion to the aircraft to provide movement of the cradle upper portion between the upright and reclined positions. The assembly has lower cradle linkage arms pivotally attaching the cradle lower portion to the aircraft independently of the upper cradle linkage arms to pivotally move the cradle lower portion relative to the cradle upper portion.

The ejection seat assembly is designed for use with a display console, positionable between the legs of the cockpit occupant. In the preferred embodiment the cradle lower portion includes a pair of leg rest, with one leg rest being positioned to each side of the display console. As such, during ejection free upward travel of the occupant's legs is permitted uninhibited by the display console as the occupant is carried in the seat even upon ejection with the cradle upper portion in the reclined position.

The assembly further includes control means for controlling operation of the power means in response to sensed aircraft G-loading and anticipated G-loading. The control means causes the power means to recline the cradle upper portion from the upright position when the greater of the sensed G-loading or anticipated G-loading exceeds a preselected lower limit G-loading force.

The control means controls operation of the power means to adjust the angular position of the cradle upper portion as a hysteretic function dependent on the value of the greater of the sensed G-loading or anticipated G-loading. The hysteretic function has a slope to provide continuous angular adjustment of the cradle upper portion between the upright and reclined positions as the cradle upper portion is moved toward the reclined position.

Other features and advantages of the invention will become apparent from the following detailed description, taken in conjunction with the accompanying drawings.

BEST MODE FOR CARRYING OUT THE INVENTION

Figure 1:
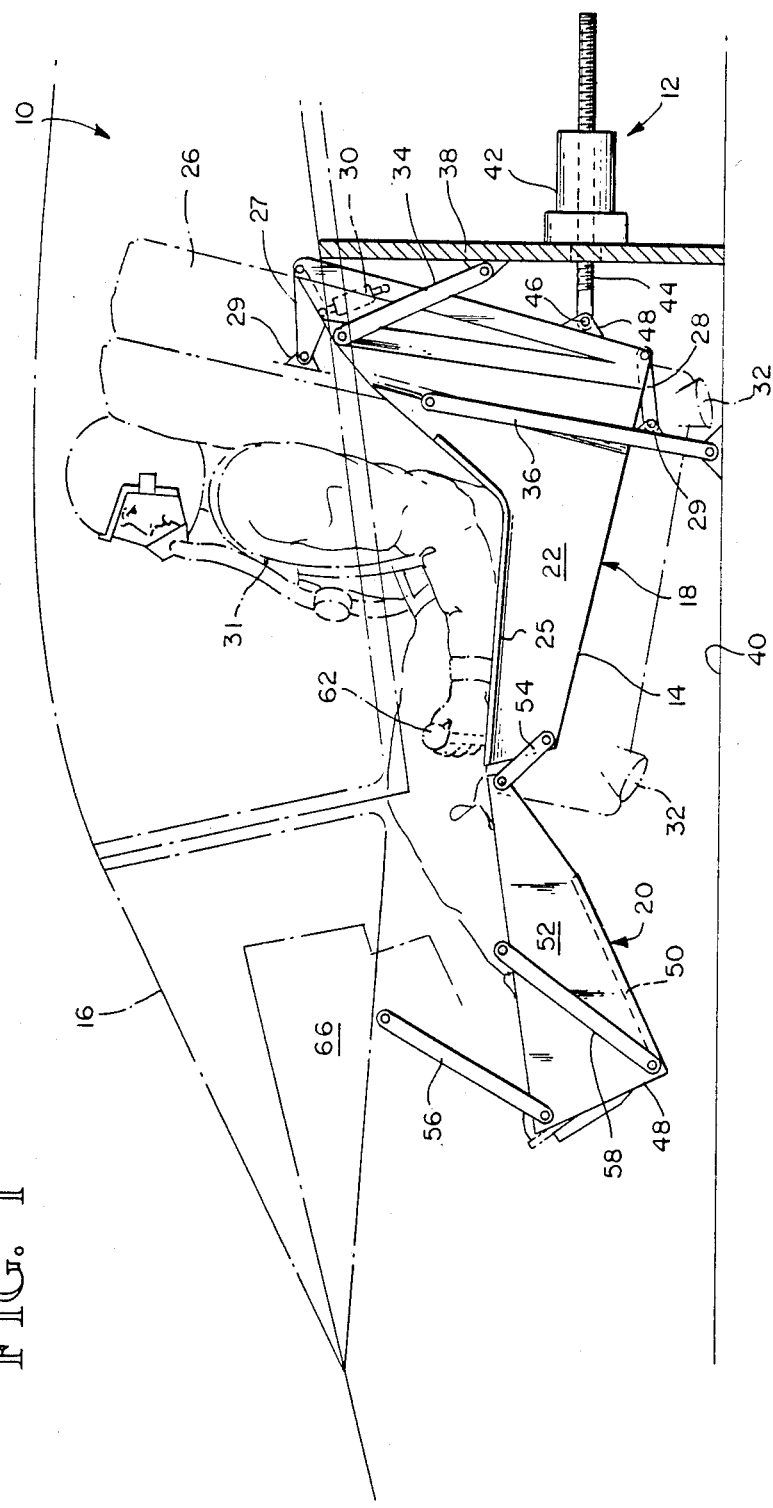
FIG. 1 is a side elevational view of a pilot seated in an ejection seat assembly embodying the present invention, with the seat shown in the upright position.

As shown in the drawings for purposes of illustration, the present invention is embodied in an ejection seat assembly indicated generally by reference numeral 10, which includes a control system indicated generally by reference numeral 12.

Figure 2:
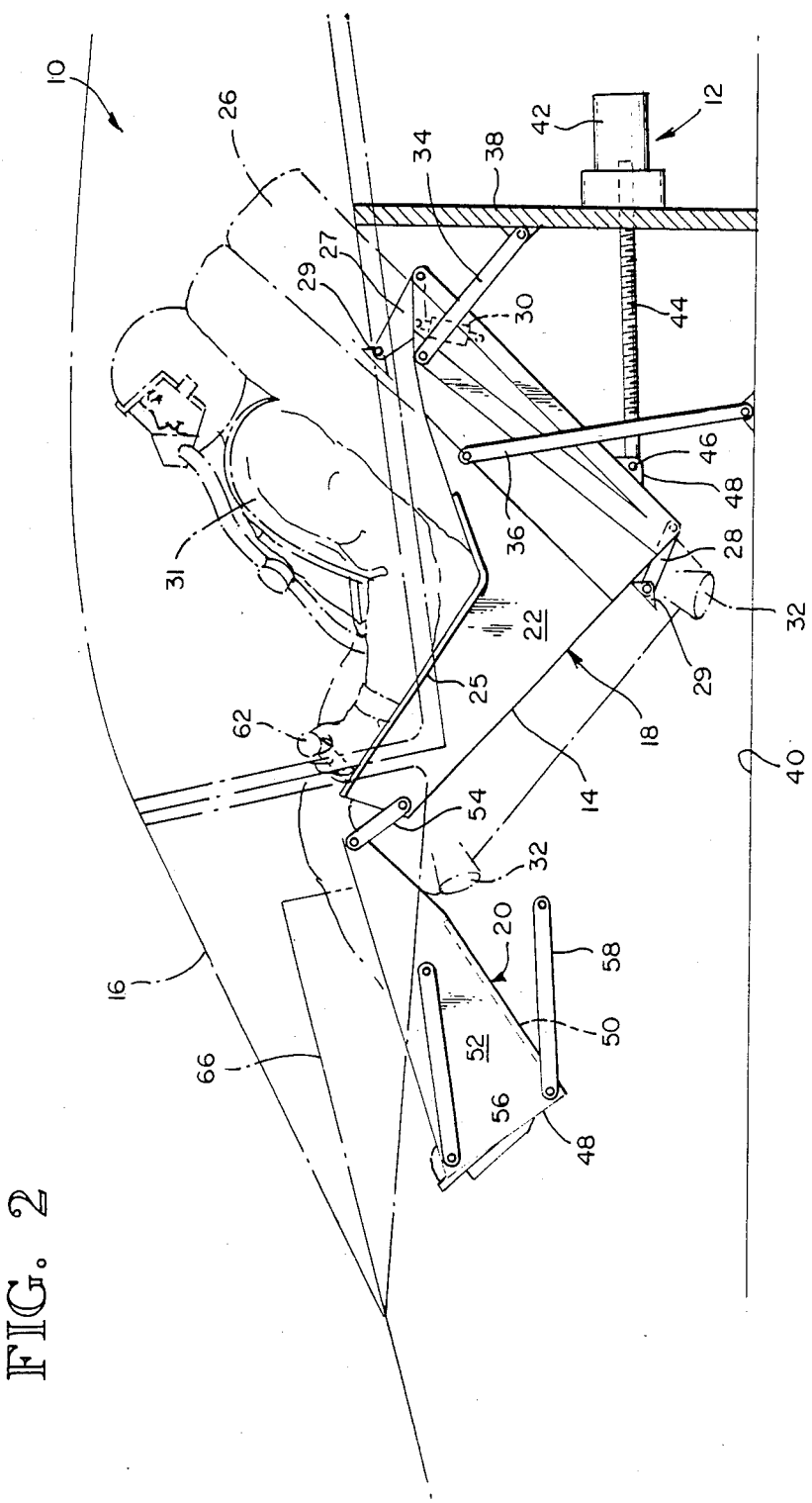
FIG. 2 is a side elevational view of the ejection seat assembly of FIG. 1 with the seat shown in the reclined position.
Figure 3:
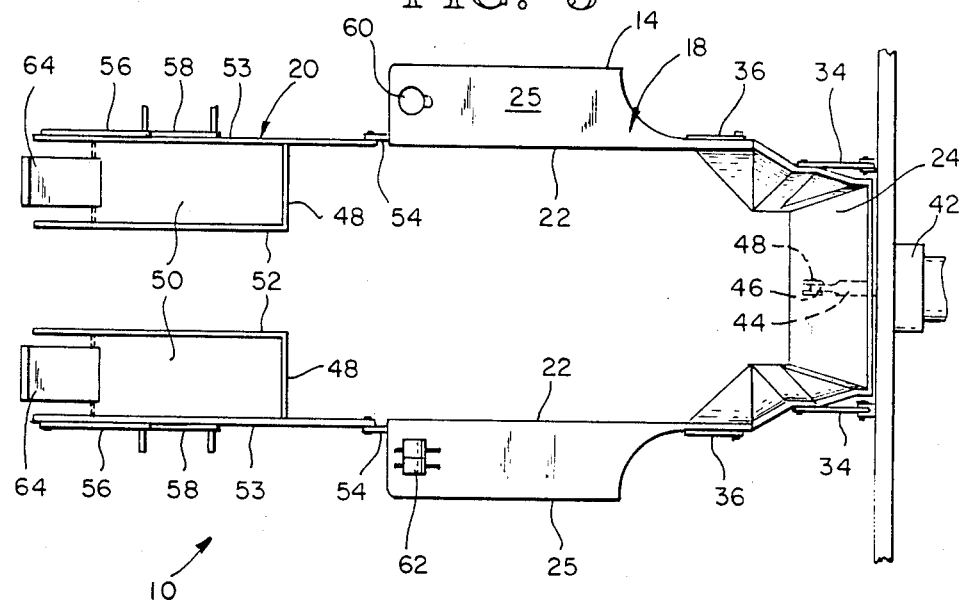
FIG. 3 is a top plan view of the ejection seat assembly of FIG. 1 shown in the upright position without the pilot and the ejectable seat portion, and without the seat adjust link arms or actuator.

The ejection seat assembly 10 has a cradle 14 positioned within the cockpit of an aircraft 16, shown in phantom line in FIG. 1 and 2. The cradle 10 has a rigid, non-articulated upper portion 18 and a separate but attached rigid lower portion 20. The cradle upper portion 18 forms an ejection seat cradle defined by a pair of spaced apart left and right side panels 22, a back panel 24, and a pair of left and right arm rests 25. Each of the side panels 22 is rigidly attached to the back panel 24, and each of the arm rests is rigidly attached to and projects laterally outward from the correspondingly positioned side panel 22.

The cradle upper portion 18 is sized and shaped to receive a conventional non-articulated, self-propelled ejection seat 26. The ejection seat 26 is removably carried within the cradle upper portion 18 by a pair of left and right upper link arms 27 and a pair of left and right lower link arms 28 forming a part of the cradle 14. The upper and lower link arms 27 and 28 each have one end pivotally attached to the cradle upper portion 18, and the other end pivotally attached to an attachment member 29 which is removably attached to the ejection seat 26 in a conventional manner. A centrally positioned extensible actuator 30, shown in phantom in FIGS. 1 and 2, is pivotally attached by one end to the cradle upper portion 18 and by the other end to a connector arm (not shown) extending between and interconnecting the left or right upper link arms 27. Manual control means (not shown) are provided to allow a pilot or other occupant 31 sitting in the ejection seat 26 to selectively extend and retract the actuator 30 to adjustably move the ejection seat relative to the upper cradle portion 18 in order to move the pilot to the design eyepoint of the aircraft. In such manner, the ejection seat assembly 10 can accommodate height differences of seat occupants and place each occupant at the aircraft design eyepoint for the desired visibility. It is noted that while the upper and lower link arms 27 and 28 and the actuator 30 permit adjustment of the ejection set 26 relative to the cradle upper portion 18, the movement is of limited amount and primarily a vertical seat height adjustment, and except during the short time period required to complete the seat adjustment, the ejection seat is stationary with respect to the cradle upper portion during nonejection use.

As noted above, the cradle upper portion 18 is a non-articulating unit which carries the ejection seat 26 therewith as the cradle upper portion is angularly moved within the cockpit between an upright position shown in FIG. 1 and a reclined position shown in FIG. 2. The cradle upper portion 18 can be moved to recline the pilot 31 between 50-70 degrees to provide adequate G-protection from G-loading for 7-9 G's, or to recline the pilot even more for larger G-loading. The ejection seat 26 may be of any suitable conventional design having a rigidly interconnected back and seat structure which includes a built-in propulsion unit to propel the ejection seat with the pilot 31 sitting therein free of the cockpit during ejection. The cradle upper portion 18 is constructed with an open bottom to permit the lower portion of the seat structure of the ejection seat 26 and a plurality of propulsion nozzles 32 forming part of the ejection seat to project downwardly and beyond the cradle side panels 22.

The cradle upper portion 18 is pivotally attached to the aircraft 16 by a pair of left and right upper link arms 34 and a pair of left and right lower link arms 36. The upper and lower link arms 34 and 36 each have one end pivotally attached to the correspondingly positioned left or right side panel 22 of the cradle upper portion 18. The upper link arms 34 each have their other end pivotally attached to a rearward bulkhead 38 of the aircraft 16, and the lower link arms 36 each have their other end pivotally attached to a deck panel 40 of the aircraft 16 at a location forward of the bulkhead.

The cradle upper portion 18 is selectively, angularly movable as a unit within the aircraft cockpit between the upright position and the reclined position by a power actuator 42 attached to the rearward bulkhead 38. The actuator has a forwardly projecting drive arm 44 with a forward end 46 pivotally attached to the back panel 24 by a flange 48. The flange 48 is rigidly attached to the rearward face of the back panel 24 at a central location toward the lower end of the back panel. As the actuator drive arm 44 is extended forwardly, the cradle upper portion 18 is selectively, angularly moved as a unit through the pivotal action of the upper and lower link arms 34 and 36 from the upright position shown in FIG. 1 to the reclined position shown in FIG. 2, with the cradle upper portion being positionable in any angular position therebetween. As the actuator arm 44 is retracted rearwardly, the cradle upper portion 18 is selectively, angularly moved toward and returned to the upright position.

The cradle lower portion 20 includes a pair of spaced apart left and right, forwardly projecting leg rests 48. Each leg rest 48 is formed by a bottom panel 50 and a pair of upwardly projected inside and outside side panels 52 and 53, respectively, rigidly attached to the bottom panel. The leg rests 48 are each pivotally attached to the cradle upper portion 18 by a pair of left and right links 54. The links 54 each have one end pivotally attached to the correspondingly positioned outside leg rest side panel 53 and the other end pivotally attached to the corresponding positioned side panel 22 of the cradle upper portion 18.

The cradle lower portion 20 is also pivotally attached to the aircraft 16 by a pair of left and right upper link arms 56 and a pair of left and right lower link arms 58. One end of each of the upper and lower link arms 56 and 58 is pivotally attached to the correspondingly positioned outside side panel 53 of the corresponding leg rest 48, and the other end of each of the upper and lower link arms is pivotally attached to the aircraft interior sidewall. The upper and lower link arms 56 and 58 and the links 54 are arranged such that the cradle lower portion 20 pivotally moves between a lower position, as shown in FIG. 1 when the cradle upper portion 18 is in the upright position, and a raised position as shown in FIG. 2 when the cradle upper portion is in the reclined position. Movement of the cradle lower portion between the lowered and raised positions is in response to movement of the cradle upper portion between its upright and reclined positions, respectively, with power for movement being indirectly supplied through the cradle upper portion by the power actuator 42.

In operation, the ejection seat assembly 10 provides a G-protective ejection seat for the pilot 31 which is selectively movable from the upright position shown in FIG. 1 during flight time not requiring G-load protection to the recline position shown in FIG. 2 or any desired angular position therebetween which minimizes the G-loading effect during the duration of a high G-load maneuver. After the maneuver is complete, the seat may be returned to the upright position. As will be described in more detail below, ejection seat 10 may be quickly and smoothly moved between these positions with minimum loss of pilot visibility, with no pilot upper body posture change or mobility loss, and with little, if any, pilot performance loss as a result of ejection seat movement or pilot position changes. Moreover, the movement can be made automatically by the control system 12 in anticipation of a high G-load maneuver, with automatic return of the ejection seat 10 to the upright position when the maneuver is completed. Thus, the pilot will be reclined for only that portion of an engagement involving a high G-load maneuver and the pilot need not take time for manual set adjustments. When in the reclined position, the pilot 31 is in a supine position which increases the occupant's ability to function under high G-load maneuvers, as will be described.

In addition to serving as a conventional arm rest, arm rests 25 provide support for selected hand operated flight controls, such as a control stick 60 mounted on the right arm rest and throttles 62 mounted on the left arm rest. Similarly, the leg rests 48 provide supports for mounting foot actuated flight controls, such as a pair of left and right rudder pedals 64. In such manner, as the cradle 14 is pivoted about as necessary to facilitate high G-load maneuvers, the upper body of the pilot 31 is maintained stationary with respect to the ejection seat 26 carried by the cradle upper portion 18 and his arms are maintained in a constant position relative to the control stick 60 and throttle 62 throughout movement of the seat. While the legs of the pilot 31 are raised and lowered relative to his upper body, the movement is relatively slight and occurs only at the knee joint of the occupant. The occupant's feet remain in a constant position on the rudder pedals 64 throughout the seat movement. This permits very fast movement of the ejection seat in response to rapid G-onset without affecting pilot performance or comfort.

In the event it is necessary to eject the pilot 31 from the aircraft 16, the ejection seat 26 may be fired to propel the ejection seat with the occupant therein free of the cockpit while the cradle 14 and the control stick 60, throttle 62 and rudder pedals 64 remain in place within the aircraft. In such manner, a reclining ejection seat assembly 10 can be constructed utilizing a conventional ejection seat 26 without adding weight to the ejection seat which would require additional propulsion to carry the extra weight of the cradle, its pivot members and the hand and foot controls. Also, a reclinable seat assembly is provided which can use existing ejection seats which are not capable of articulated movement.

Moreover, the ejection seat assembly 10 allows incorporation of various design conventional ejection seats and for their easy interchangeability. By not requiring modification of the conventional ejection seat, the seat design is less complex and existing ejection seats with known performance, and proven reliability and safety may be used. The cradle 14 provides G-load protection for the pilot 31 through reclining the occupant with a less complex, bulky and heavy design and construction than accomplished with prior art reclining seats, while improving pilot control and performance as the seat is moved between the upright and reclined positions.

The cradle 14 will normally be repositioned to the fully upright position for ejection, however, should a malfunction which leaves the ejection seat in a partially or fully reclined position, the ejection seat 26 can be fired with the cradle 14 in the reclined position or any position between fully reclined or fully upright. The ability to eject from a reclined position is provided because the cradle 14 of the present invention maintains the pilot's body positioned at all reclining angles within the ejection seat envelope. This is to be compared with prior art articulated reclining seats which when reclined, place the pilot's body in a position not suitable for ejection, and hence require that the seat be returned to the upright position for a successful ejection. To facilitate ejection of the pilot 31 with the cradle 14 in any angular position, the aircraft 16 utilizes a narrow central display console 66 positioned between the leg rests 48 so that the legs of the cockpit occupant extend forward to each side of the central console. This permits free upward travel of the pilot's legs uninhibited by the display console as he is carried away in the ejection seat 26 upon its ejection even when the cradle upper portion 18 in the reclined position.

The cradle 14 may be positioned by manually operating a switching mechanism (not shown) located within the convenient reach of the pilot 31, or automatically by the control system 12, as will be described in more detail below. The control system 12 controls operation of the power actuator 42 in order to automatically position the cradle 14 and ejection seat 26 carried therein responsive to aircraft performance and anticipated performance.

Figure 4:
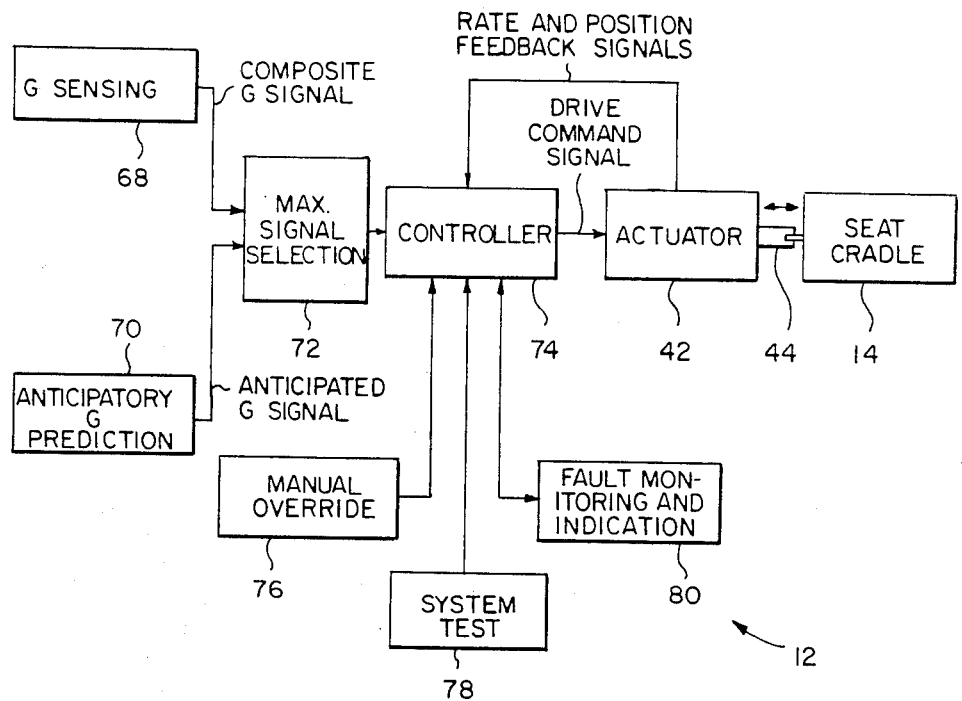
FIG. 4 is a functional block diagram of the control system for the ejection seat assembly of FIG. 1.

A functional description of the control system 12 will first be provided, with reference being made to the functional block diagram of FIG. 4. As indicated by block 68 in FIG. 4, G-sensing occurs based upon aircraft acceleration in terms of G-load sensed at the pilot's station in the cockpit. The sensed G-load is used to determine the G-loading rate and the two parameters are combined, as will be described below, to produce a composite G-loading signal.

Due to the rapid G-rates or G-onset experienced with current and especially future generation fighter aircraft, it is undesirable to rely only upon sensed G-loading to control reclining of the cradle 14 during a high G-load maneuver. As indicated by block 70 in FIG. 4, G-load prediction occurs based on various sensed aircraft parameters, and an anticipated G-load signal is produced. The anticipated G-loading signal indicates the anticipated G-load the pilot 31 may expect to encounter during the aircraft maneuver initiated, as calculated from the sensed aircraft parameters.

The composite G-loading signal and the anticipated G-loading signal are compared and the signal indicative of the largest G-load is selected, as shown by block 72, and provided to a controller 74. Based upon this signal, the controller 74 determines whether the cradle 14 should be reclined, or if already reclined, whether the cradle should be further reclined or brought back to the upright position. The controller 74 provides a drive command signal to the actuator 42.

In such manner, even if the present G-load on the pilot 31 is not sufficient to require reclining of cradle 14, should a high G-load maneuver be predicted based upon the present state of the sensed aircraft parameters, the controller 74 provides a drive signal to energize the actuator 42 and thereby recline the cradle and hence the pilot in advance preparation of the G-loading. Moreover, the controller will automatically cause the cradle to recline to an angular position selected to provide maximum G-load protection for the pilot with minimum pilot or ejection seat movement. By not fully reclining the cradle, better pilot visibility is achieved while still realizing the necessary G-protection. Should the anticipated G-load on the pilot or the actual G-loading increase, the controller will further recline the cradle 14 until the cradle is fully reclined. When the actual G-loading on the pilot decreases below a preselected level, assuming another high G-load maneuver is not anticipated, the cradle will be automatically returned to the upright position so that the pilot is in an upright position during lower G-load maneuvers to afford him maximum vision, mobility and situational awareness in the combat arena. As will be described below, the controller 74 may also be programmed without allowing for continuous adjustment of the reclining angle of the cradle, but rather to simply fully recline the cradle in response to the G-loading signal.

As shown in FIG. 4, conventional rate and position feedback signals are provided by the actuator 42 to the controller 74 to provide for stability and smoothness of operation of the actuator, and hence movement of the cradle 14. A manual override 76 is also provided which allows the pilot 31 to preposition and fix the cradle 14, and hence the ejection seat 26, to a variety of reclined positions. The manual override 76 may be used to allow the pilot to fix the cradle in the fully upright position for the entire maneuver or select an intermediate reclined position as the nominal position from which the cradle will be moved in response to the G-loading signals as described above. As such, the total cradle and seat movement which occurs during a maneuver relative to the nominal position is less than had the nominal position selected been the upright position. Of course, the manual override 76 can also be used to partially recline the seat for pilot comfort during long duration cruises such as for ferry missions.

The control system 12 further includes a system test 78 to allow preflight testing of the control system and fault monitoring and indication 80.

Figure 5:
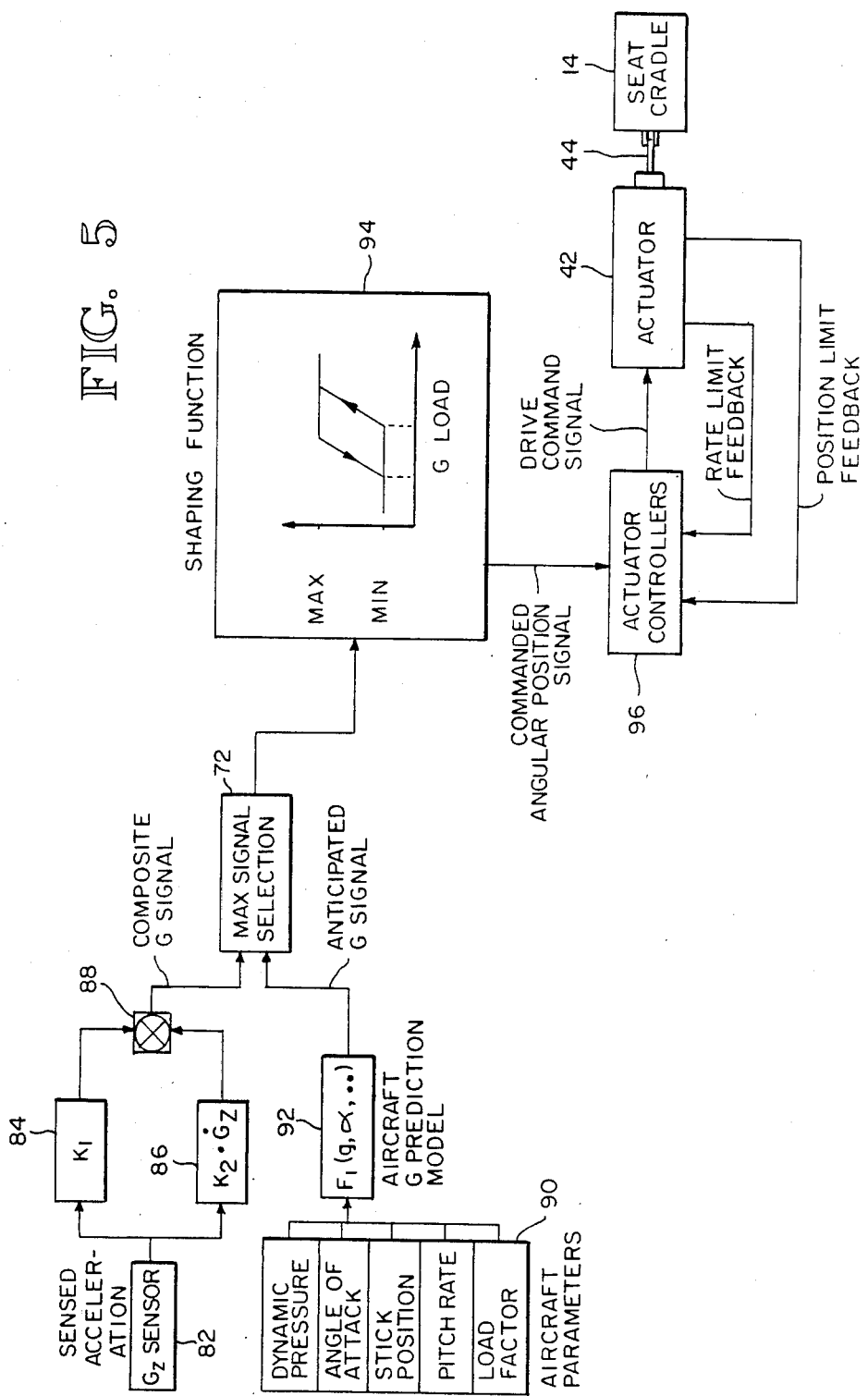
FIG. 5 is a block diagram showing the control logic for operating the ejection seat assembly of FIG. 1.

The control logic for the control system 12 is shown in more detail in block diagram form in FIG. 5. It is noted that the control logic is implemented primarily by software.

As shown in FIG. 5, an aircraft frame mounted G-sensor 82 located at the pilot's station in the cockpit measures aircraft Z-axis G-load and provides a G-load indicating signal to the controller 74. This signal is amplified with a gain of $K_1$, as indicated by block 84, and also differentiated and amplified with a gain of $K_2$, as indicated by block 86. The differentiated G-load signal equates in the G-loading rate at the pilot's station.

The amplified and differentiated signals are summed, as indicated by block 88, to produce the composite G-loading signal.

Stick position, and aircraft performance related parameters, such as aircraft dynamic pressure, angle of attack, pitch rate and load factor, comprise the previously mentioned sensed aircraft parameters, as indicated by block 90, which are used to calculate the anticipated G-loading signal in accordance with conventional aircraft flight algorithms. As indicated by block 92, the control system 12 uses a flight modeling algorithm unique to the aircraft within which the ejection seat assembly 10 is installed to determine the anticipated G-loading signal. These parameters are generally measured and used by the aircraft on-board systems for other functions, and are readily available. As before described, the maximum of the composite G-loading signal and the anticipated G-loading signal is selected, as indicated by block 72.

Figure 6:
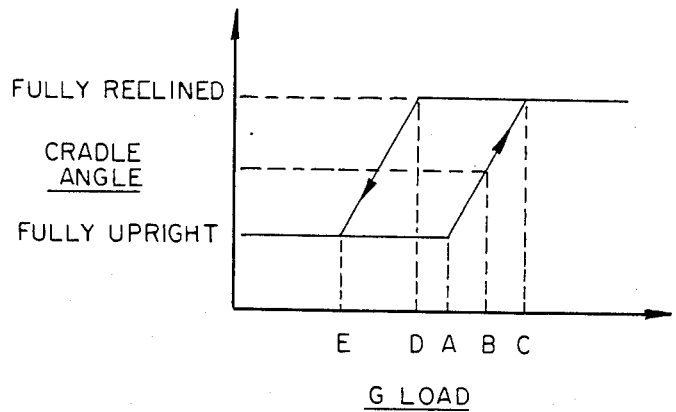
FIG. 6 shows a preferred shaping function used to determine angular movement of the ejection seat assembly of FIG. 1.

The selected signal is used with a shaping function, as shown in block 94 and in FIG. 6, to determine a commanded angular position signal indicating the angle at which the cradle 14 is to be positioned. The shaping function is preferably a hysteretic function to avoid undesirable oscillatory movement of the cradle 14 between the upright and reclined positions due to fluctuations in the G-loading signal being used to determine cradle position. As best shown in FIG. 6, at low G-loading signal levels below the value A, the cradle remains in the upright position. When the value of the G-loading signal increases to and beyond the value A, the control system 12 will cause the seat to recline, with the degree of incline between the fully upright and fully reclined positions for a signal value between the values A and C being proportional to the slope of the hysteretic curve. For example, at the signal value B, the cradle 14 will be reclined about half-way between the fully upright and fully reclined angular positions. The angular movement control permitted is continuous. If the G-loading signal reaches the signal value C or above, the cradle will be fully reclined.

The control system 12 begins repositioning of the cradle to the upright position when the G-loading signal decreases to and below the signal value D. This occurs after the anticipated high G-load maneuver has been at least partially performed, assuming no further high G-load maneuver is anticipated by the control system, and the anticipated G-loading signal drops below the composite G-loading signal (i.e., the signal based on sensed G-load at the pilot's station). As the composite G-loading signal decreases toward the signal value E, the angular position of the cradle will be proportionately adjusted toward the fully upright position. By using a hysteretic function, fluctuations in the G-loading signal about the signal value C will not cause possibly annoying angular movement of the cradle from the fully reclined position, thus adding to the operational stability of the cradle control system.

Figure 7:
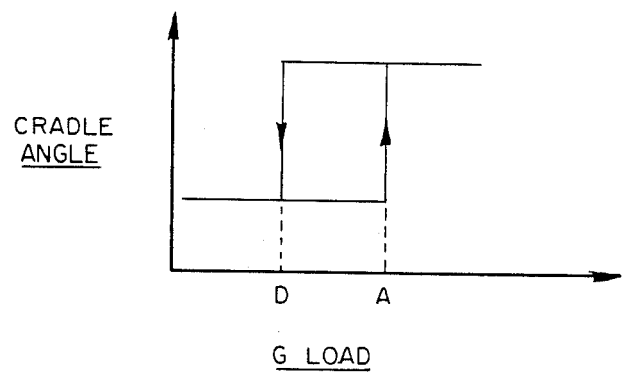
FIG. 7 shows an alternative shaping function for the shaping function shown in FIG. 6.

If desirable, the function use to control the angular movement can be modified to suit the needs of the pilot or aircraft. For example, a step function is illustrated in FIG. 7 in which the cradle is moved between the fully upright and fully reclined, with no intermediate cradle positions, when the G-loading signal exceeds the signal value a. A hysteretic function is utilized to avoid undesirable sudden changes between the two positions as a result of signal fluctuations.

The commanded cradle angular position signal is provided to an actuator controller 96 of conventional design. Based upon this signal, the actuator controller 96 provides the drive command signal to the actuator 42, which as previously described, causes the drive arm 44 of the power actuator 42 to extend or retract for angular repositioning of the cradle 14 and the ejection seat 26 carried therein. In usual fashion the actuator 42 provides rate and position limit feedback signals to the actuator controller 96 to provide stability and smoothness to the operation of the actuator. These signals establish end position limits and a maximum rate limit for the actuator operation, and hence limit the angular positions to which the actuator can drive the cradle and set the maximum speed at which the angular position of the cradle can be changed. These limits can be preselected for the desired cradle operation.

It will be appreciated that, although a specific embodiment of the invention has been described herein for purposes of illustration, various modifications may be made without departing from the spirit and scope of the invention. Accordingly, the invention is not limited except as by the appended claims.

We claim:

1. A G-protective ejection seat assembly for an occupant of the cockpit of an aircraft utilizing a separable ejection seat including propulsion means for separating the ejection seat from the cockpit and propelling the seat with the occupant therein free of the cockpit during ejection, comprising:

a cradle having a non-articulated upper portion and a lower portion, said cradle upper portion being attachable to the aircraft for selective angular movement within the cockpit between an upright position and a reclined position, said cradle upper portion being selectively positionable during use in said upright and reclined positions, said cradle having control support means for supporting hand and foot flight controls of the aircraft for movement with said cradle, the ejection seat being releasably carried by and substantially stationary with respect to said cradle upper portion during non-ejection use, the seat being moved with said cradle upper portion as said cradle upper portion moves between said upright and reclined positions, said cradle being arranged to support the occupant in the seat in a normally upright position when said cradle upper portion is in said upright position and in a supine position when said cradle upper portion is in said reclined position, the ejection seat being movable upon ejection independent of said cradle and the hand and foot flight controls supported by said cradle, upon ejection said cradle and the hand and foot controls remaining in place within the aircraft while the seat is propelled out of the cockpit; and power means for selectively angularly moving said cradle upper portion between said upright and reclined positions.

2. The ejection seat assembly of claim 1 wherein said cradle lower portion is movably attached to said cradle upper portion and the assembly further includes means for moving said cradle lower portion between a lowered position and a raised position in response to movement of said cradle upper portion between said upright and reclined positions, respectively.

3. The ejection seat assembly of claim 2 wherein said cradle lower portion includes a pair of spaced apart leg rests each separately pivoted to said cradle upper portion and to the aircraft.

4. The ejection seat assembly of claim 1 wherein said cradle upper portion is positionable in a plurality of angular positions between said upright and reclined positions.

5. The ejection seat assembly of claim 1 wherein said power means includes an actuator connected between said cradle and the aircraft for applying directed force on said cradle to move said cradle upper portion between said upright and reclined positions.

6. The ejection seat assembly of claim 1 further including upper cradle linkage arms pivotally attaching said cradle upper portion to the aircraft to provide pivotal movement of said cradle upper portion between said upright and reclined positions.

7. The ejection seat assembly of claim 6 further including lower cradle linkage arms pivotally attaching said cradle lower portion to the aircraft independently of said upper cradle linkage arms to pivotally move said cradle lower portion relative to said cradle upper portion between a lowered position and a raised position in response to movement of said cradle upper position between said upright and reclined positions, respectively.

8. The ejection seat assembly of claim 1 further including means for adjustably moving the ejection seat relative to said cradle upper portion to move the occupant to the design eyepoint of the aircraft.

9. The ejection seat assembly of claim 1 wherein said control support means includes upper support means for supporting said hand flight controls on said cradle upper portion for movement therewith, and lower support means for supporting said foot flight controls on said cradle lower portion for movement therewith.

10. The ejection seat assembly of claim 9 wherein said upper support means includes at least one arm rest to which said hand flight controls are mounted.

11. The ejection seat assembly of claim 1 for use with a display console positionable between the legs of the cockpit occupant, wherein said cradle lower portion includes a pair of leg rests, one leg rest being positioned to each side of the display console, whereby during ejection free upward travel of the occupant's legs is permitted uninhibited by the display console as the occupant is carried in the seat even upon ejection with said cradle upper portion in said reclined position.

12. The ejection seat assembly of claim 1 further including control means for controlling operation of said power means in response to sensed aircraft G-loading and anticipated G-loading.

13. The ejection seat assembly of claim 12 wherein said control means causes said power means to recline said cradle upper portion from said upright position when the greater of said sensed G-loading or said anticipated G-loading exceeds a preselected G-loading force.

14. The ejection seat assembly of claim 13 wherein said control means controls operation of said power means to adjust the angular position of said cradle upper portion as a hysteretic function dependent on the value of the greater of said sensed G-loading or said anticipated G-loading, said function providing an offset between the maximum G-loading necessary to cause said cradle upper portion to be in said reclined position and the maximum G-loading which will cause said cradle upper portion to move toward said upright position.

15. The ejection seat assembly of claim 14 wherein said hysteretic function has a slope to provide continuous angular adjustment of said cradle upper portion at angular positions between said upright and reclined positions as said cradle upper portion is moved toward said reclined position.

16. The ejection seat assembly of claim 12 wherein said control means further includes anticipatory means for anticipating aircraft G-force related performance and controlling operation of said power means in response thereto.

17. The ejection seat assembly of claim 16 wherein said anticipatory means is responsive to sensed aircraft G-force related parameters.

18. The ejection seat assembly of claim 12 further including:
   first sensor means for sensing G-loading at the cockpit and generating a sensed aircraft G-loading signal in response thereto;
   means for determining selected sensed anticipatory aircraft parameters and generating an anticipatory G-loading signal in response thereto; and
   control means for controlling operation of said power means in response to said G-loading signal and said anticipatory G-loading signal.

19. A G-protective ejection seat assembly for an occupant of the cockpit of an aircraft, comprising:
   a non-articulated, rigid ejection seat cradle, said cradle having control support means for supporting hand flight controls of the aircraft for movement with said cradle;
   means attachable to the aircraft for supporting said cradle for selective angular movement within the cockpit between an upright position and a reclined position, said cradle being selectively positionable during use in said upright and reclined positions;
   a separable, non-articulated ejection seat releasably carried by and substantially stationary with respect to said cradle during non-ejection use, said seat being moveable with said cradle as said cradle moves between said upright and reclined positions, said seat supporting the occupant in a normally upright position when said cradle is in said upright position and in a supine position when said cradle is in said reclined position, said ejection seat being movable upon ejection independent of said cradle and the hand flight controls supported by said cradle, said ejection seat including propulsion means for separating said ejection seat from said cradle and propelling said seat with the occupant therein free of the cockpit during ejection with said cradle and the hand controls remaining in place within the aircraft; and
   power means for selectively angularly moving said cradle between said upright and reclined positions.

20. The ejection seat assembly of claim 19 further including leg supports movably attached to said cradle and having control support means for supporting foot flight controls of the aircraft for movement with the leg supports, and further including means for moving said leg supports between a lowered position and a raised position in response to movement of said cradle between said upright and reclined positions, respectively.

21. The ejection seat assembly of claim 20 wherein said leg supports include a pair of spaced apart leg rests each separately pivoted to said cradle upper portion and to the aircraft.

22. The ejection seat assembly of claim 19 wherein said cradle is positionable in a plurality of angular positions between said upright and reclined positions.

23. The ejection seat assembly of claim 19 further including means for adjustably moving said ejection seat relative to said cradle to move the occupant to the design eyepoint of the aircraft.

24. The ejection seat assembly of claim 19 further including control means for controlling operation of said power means in response to sensed aircraft G-loading and anticipated G-loading.

25. The ejection seat assembly of claim 24 wherein said control means causes said power means to recline said cradle from said upright position when the greater of said sensed G-loading or said anticipated G-loading exceeds a preselected G-loading force.

26. The ejection seat assembly of claim 25 wherein said control means controls operation of said power means to adjust the angular position of said cradle as a hysteretic function dependent on the value of the greater of said sensed G-loading or said anticipated G-loading, said function providing an offset between the maximum G-loading necessary to cause said cradle to be in said reclined position and the maximum G-loading which will cause said cradle to move toward said upright position.

27. The ejection seat assembly of claim 26 wherein said hysteretic function has a slope to provide continuous angular adjustment of said cradle at angular positions between said upright and reclined positions as said cradle is moved toward said reclined position.

28. The ejection seat assembly of claim 24 wherein said control means further includes anticipatory means for anticipating aircraft G-force related performance and controlling operation of said power means in response thereto.

29. The ejection seat assembly of claim 28 wherein said anticipatory means is responsive to sensed aircraft G-force related parameters.

30. A G-protective ejection seat assembly for an occupant of an aircraft comprising:
an ejection seat attachable to the aircraft for selective angular movement with the aircraft between an upright position and a reclined position;
power means for selectively angularly moving said ejection seat between said upright and reclined positions; and
control means for controlling operation of said power means in response to sensed aircraft G-loading and anticipated G-loading.

31. The ejection seat assembly of claim 30 wherein said control means is responsive to G-loading, said control means causes said power means to recline said ejection seat from said upright position when the greater of said sensed G-loading or said anticipated G-loading exceeds a preselected G-loading force.

32. The ejection seat assembly of claim 31 wherein said control means controls operation of said power means to adjust the angular position of said ejection seat as a hysteretic function dependent on the value of the greater of said sensed G-loading or said anticipated G-loading, said function providing an offset between the maximum G-loading necessary to cause said ejection seat to be in said reclined position and the maximum G-loading which will cause said ejection seat to move toward said upright position.

33. The ejection seat assembly of claim 32 wherein said hysteretic function has a slope to provide continuous angular adjustment of said ejection seat at angular positions between said upright and reclined positions as said ejection seat is moved toward said reclined position.

* * * * *